C. B. Seaman,
Mosquito Net,
Nº 84,381. Patented Nov. 24, 1868.
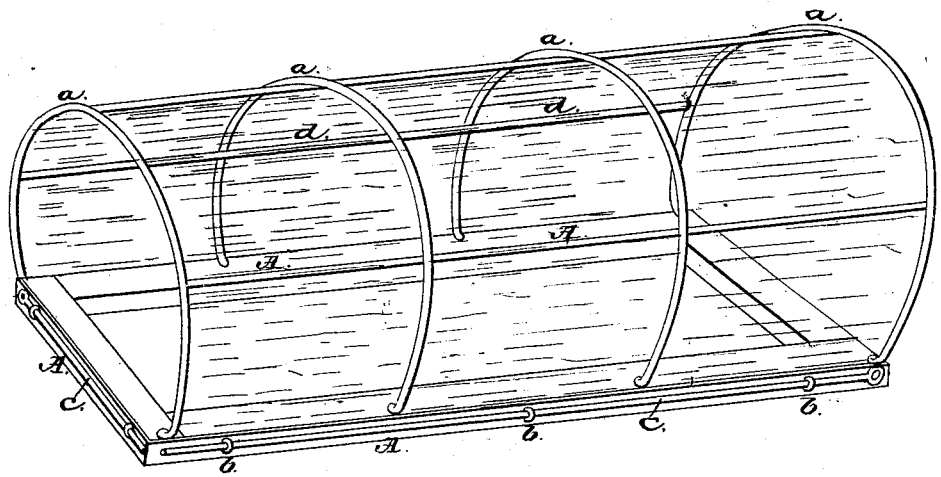
Attest:
Wm A Morgan
Alex F. Roberts
Inventor:
C. B. Seaman.
per [signature]
Attorneys.

CHARLES B. SEAMAN, OF HONESDALE, PENNSYLVANIA.

Letters Patent No. 84,381, dated November 24, 1868.

IMPROVED INSECT-NET.

The Schedule referred to in these Letters Patent and making part of the same.

*To all whom it may concern:*

Be it known that I, CHARLES B. SEAMAN, of Honesdale, in the county of Wayne, and State of Pennsylvania, have invented a new and improved Mosquito-Netting; and I do hereby declare that the following is a full, clear, and exact description thereof, which will enable those skilled in the art to make and use the same, reference being had to the accompanying drawings, forming part of this specification, in which the drawing represents a perspective view of my invention.

The object of this invention is to provide a simple and convenient apparatus for excluding mosquitoes or flies from sleeping persons.

It consists of a rectangular frame, A, of wood, of suitable dimensions to enclose a person, and provided with several wooden or wire bows, $a\ a\ a\ a$, arising therefrom, and longitudinal rods, $d$, over which a mosquito-netting is stretched, as shown.

The edges of the netting are attached to the frame A by means of eyes or button-holes, made in its border or edge, fitting over small eye-bolts, $b$, arranged around the sides of the frame, as shown, and rods $c$ passing through the said eyes.

The rods serve to keep the edges of the netting in close contact with the frame, so that no insects can enter at the edges.

This apparatus is placed upon the bed, enclosing the sleeper.

Having thus described my invention,

I claim as new, and desire to secure by Letters Patent—

The frame A, having bows $a$, or rods $d$, and provided with a netting, which is secured by rods $c$ and eye-bolts $b$, all substantially as described, as a new article of manufacture.

The above specification of my invention signed by me, this    day of    , 1868.

CHARLES B. SEAMAN.

Witnesses:
C. F. ELDRED,
JAMES R. KEEN.